No. 863,632.　　　　　　　　　　　　　　　　　　　　PATENTED AUG. 20, 1907.
P. PETERSON.
GARDEN RAKE ATTACHMENT.
APPLICATION FILED JAN. 2, 1907.
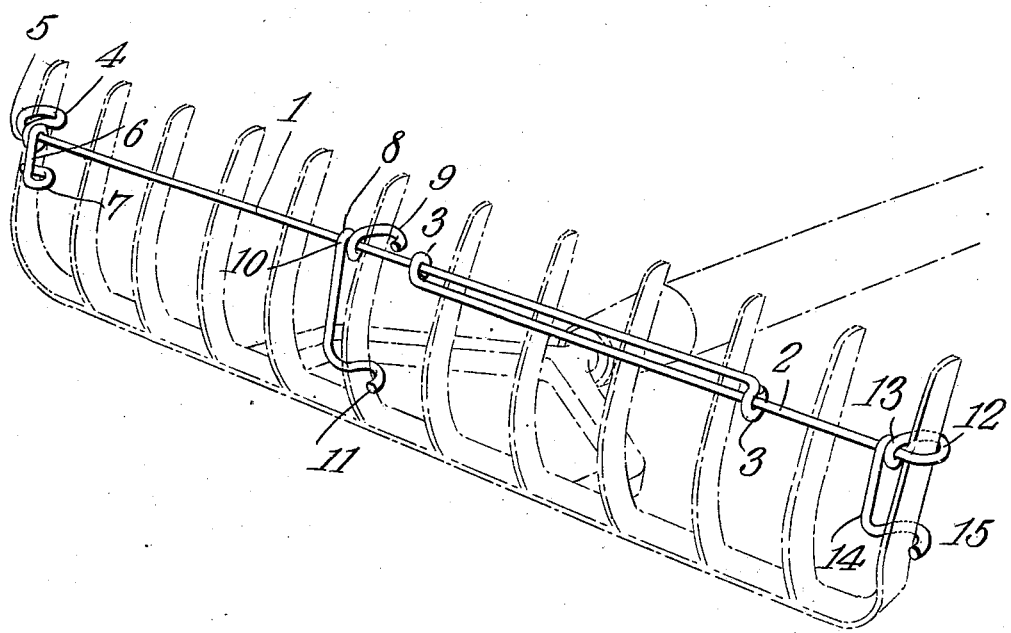
WITNESSES:
Paul Peterson,
INVENTOR.
By C. A. Snow & Co.
ATTORNEYS

UNITED STATES PATENT OFFICE.

PAUL PETERSON, OF FAIRMONT, MINNESOTA.

GARDEN-RAKE ATTACHMENT.

No. 863,632.  Specification of Letters Patent.  Patented Aug. 20, 1907.

Application filed January 2, 1907. Serial No. 350,378.

*To all whom it may concern:*

Be it known that I, PAUL PETERSON, a citizen of the United States, residing at Fairmont, in the county of Martin and State of Minnesota, have invented a new and useful Garden-Rake Attachment, of which the following is a specification.

This invention has relation to attachment for garden rakes and it consists in the novel construction and arrangement of its parts as hereinafter shown and described.

The object of the invention is to provide an attachment for rakes of the character indicated which may be easily and readily applied to the rake and easily and readily detached therefrom. The attachment is intended to prevent the tines of the rake from working too deep in the soil or upon a lawn and thereby injuring or tearing up the grass. The attachment when applied to a rake will also prevent leaves and sticks from becoming impaled or entangled about the tines. As the attachment is intended as an article of manufacture it is made adjustable in order to fit rakes of various sizes. It may therefore be detached from a rake of one size and applied to a rake of a different size.

In the accompanying drawing:—The figure is a perspective view of the rake attachment showing the same applied to a rake which is illustrated in dotted lines.

The attachment consists of the members 1 and 2 each of which is provided at its end with a loop 3. The loop of one member receives the other member which may slip longitudinally therein. Thus the members are arranged to move telescopically with relation to each other. Near the end of the member 1 the tine receiving loop 4 is formed and at the end of said loop the wire or rod of which the said member is composed is coiled upon itself as at 5 and then extends substantially at right angles to the major portion of the member 1 as at 6 and terminates in the tine-engaging hooked end 7. The latch 8 is mounted upon the member 1 and is adapted to slide longitudinally thereof, the said latch is formed up from wire or rod and is provided with the tine-receiving hook 9, the loop 10 which receives the member 1 and the tine-engaging hooked end 11.

The member 2 is provided near its outer end with the tine receiving loop 12. The wire or rod from which the member 2 is formed is then carried back and coiled upon itself as at 13 and is then extended as at 14 in the portion substantially at right angles to the major portion of the member 2 as at 14 and terminates in the tine-engaging hook 15.

From the foregoing description it is obvious that a rake attachment is provided which is composed of telescopic members each of which is provided with a tine-receiving loop and a tine-engaging hook and that one of the said members is provided with a latch which is adapted to be sprung into engagement with one of the tines of the rake for the purpose of securely holding the attachment in position upon the rake. It is therefore apparent that the members may be adjusted longitudinally of each other in order to fit rakes of different sizes. However, in order to prevent the rake tines from entering too deep into the sod or ground it is not necessary to have the attachment extend the entire length of the head of the rake for if it is applied to any of the intermediate tines it will serve as a fender for preventing the tines from working too deep.

Having described my invention what I claim as new and desire to secure by Letters Patent is:—

1. A rake attachment of the character indicated comprising telescopic members having tine engaging means.

2. A rake attachment of the character indicated comprising telescopic members having tine engaging means and a latch mounted upon one of the members.

3. A rake attachment of the character indicated comprising telescopic members having tine engaging means, a latch mounted upon one of the members and arranged to slide longitudinally thereof.

4. A rake attachment comprising telescopic members each of which is provided with a tine receiving loop and a tine engaging hook.

5. A rake attachment comprising telescopic members each of which is provided with a tine receiving loop and a tine engaging hook, a latch mounted upon one of the members and having a tine receiving and engaging means.

In testimony that I claim the foregoing as my own, I have hereto affixed my signature in the presence of two witnesses.

PAUL PETERSON.

Witnesses:
DAVID S. WADE,
JULIA I. WADE.